United States Patent

[11] 3,590,455

| [72] | Inventor | John B. Harris<br>Clifton, N.J. |
|---|---|---|
| [21] | Appl. No. | 824,987 |
| [22] | Filed | May 15, 1969<br>Division of Ser. No. 666,249, Sept. 8, 1967, abandoned. |
| [45] | Patented | July 6, 1971 |
| [73] | Assignee | Resistoflex Corporation<br>Roseland, N.J. |

[54] METHOD OF PRODUCING A HOSE FITTING HAVING A DEFORMABLE SOCKET
5 Claims, 3 Drawing Figs.

[52] U.S. Cl. ........................................................ 29/157,
29/470.5, 29/508
[51] Int. Cl. ........................................................ B21d 53/00,
B21k 29/00, B23p 15/26
[50] Field of Search ............................................ 29/157,
470.5, 508; 285/256

[56] References Cited
UNITED STATES PATENTS

| 1,908,020 | 5/1933 | Hulsart | 29/470.5 uX |
| 2,121,624 | 6/1938 | Cowles | 29/508 UX |
| 2,310,536 | 2/1943 | Melsom | 29/508 |
| 2,463,293 | 3/1949 | Mentel | 29/508 UX |
| 2,926,029 | 2/1960 | St. Clair et al. | 29/508 UX |
| 3,132,237 | 5/1964 | Pribonic | 29/4705 X |

FOREIGN PATENTS

| 677,843 | 8/1952 | Great Britain | 285/256 |
| 1,215,453 | 4/1966 | Germany | 285/256 |

*Primary Examiner*—Charlie T. Moon
*Attorney*—Robert M. Freeman

ABSTRACT: This invention relates to a method of producing a hose end fitting by welding a radially inner edge adjacent the external edge of a flange on a fitting socket to an abutment on a nipple and of providing a hose assembly therewith by radially contracting the socket while bending the flange until a sidewall of the flange engages a sidewall of a groove in the nipple to form an interlock.

PATENTED JUL 6 1971 3,590,455

INVENTOR.
JOHN B. HARRIS
BY
Ward, McElhannon, Brooks & Fitzpatrick
ATTORNEYS

METHOD OF PRODUCING A HOSE FITTING HAVING A DEFORMABLE SOCKET

This application is a Division of my copending application Ser. No. 666,249 filed Sept. 8, 1967 now abandoned.

The present invention relates to a hose fitting and, more particularly, to a fitting of the type having a nipple for insertion within the end of a hose and a socket for squeezing the hose wall against the nipple. Fittings of this type are generally referred to as swaged or crimped.

The purpose of a hose fitting is to both anchor a coupling or the like to the end of a hose and establish a satisfactory fluid seal. In order to assemble the fitting parts on the end of a hose, it is necessary that their initial dimensions be such as to make a slip fit with the hose. The socket is then subjected to substantial reduction in girth to effect the necessary grip upon the hose wall. For manufacturing reasons, generally it is not practical nor economical to fabricate the fitting in one piece. However, it is essential for satisfactory fitting operation that the socket and nipple be adequately united during the assembly thereof to prevent separation in use. For example, a good percentage of the blow-off resistance would be lost if the socket was free to move axially relative to the nipple after assembly.

Heretofore, various means have been employed to achieve a mechanical interlock between the nipple and socket. A common method is to provide threaded engagement therebetween. Providing the necessarily short threads on the nipple and socket has, however, proven a costly procedure. Furthermore, experience has shown that often in use the nipple has a rotational stress applied thereto which can result in loosening of the fitting.

It is, therefore, an object of the present invention to provide a fitting of the above type which is more economical to manufacture and, yet, overcomes the deficiencies of the prior art.

Briefly, my invention comprises a method of producing a hose end fitting which includes the steps of taking a socket member having a tubular body portion for surrounding the end of a hose and a radially inwardly directed flange at one end, the flange having at least an inner sidewall, and taking a tubular nipple member having an end portion for entering the end of said hose and an annular groove beyond said end portion. The next step comprises interfitting said nipple and socket members with the end portion of the nipple passing through said flange into said socket member, and joining the radially inner edge adjacent the exterior of the flange to the nipple member on the side of the groove remote from the end portion by forming an annular web of limited cross section preventing relative rotation between the nipple and socket members and thereby creating a one-piece structure with said groove underlying said flange. The groove is provided with an inner sidewall located on the opposite side of the groove with respect to the web to interlock with the inner of the flange when the flange is bent about the web, and it penetrates the groove upon radial contraction of the socket member about an interfitted hose end. The interlock, when perfected, prevents axial separation of the nipple and socket members in case of fracture of the web.

The invention will be better understood after reading the following detailed description of the presently preferred embodiment thereof with reference to the accompanying drawings in which.

Throughout the drawings the same reference numerals will be used to designate the same or similar parts.

Figures 1, 2, 3:
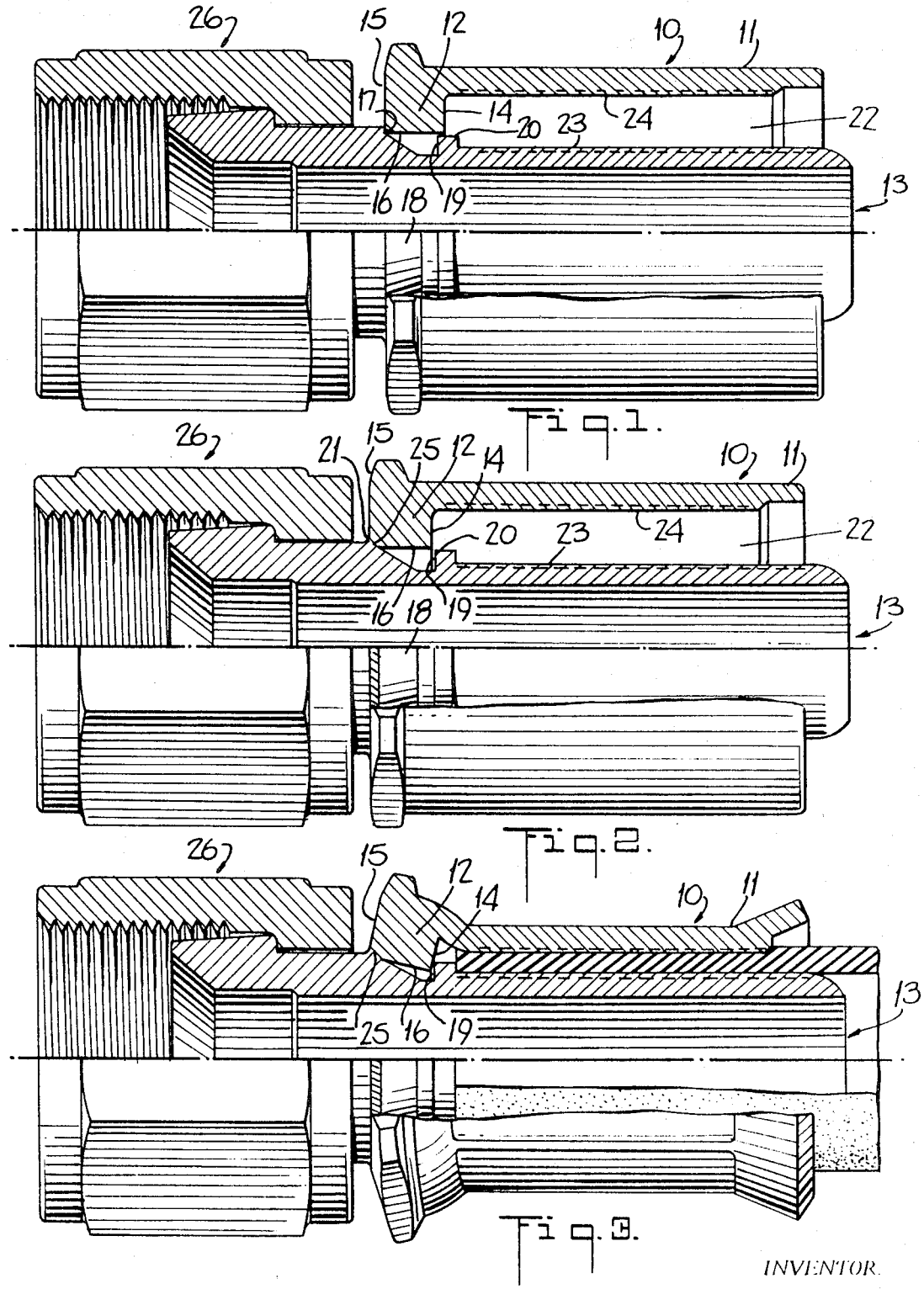
FIG. 1 is an elevational view partly in section showing the nipple and socket members of the fitting at an initial stage in the fabrication thereof.
FIG. 2 is a view similar to FIG. 1 showing the fitting after fabrication is completed.
FIG. 3 is a view partly in section showing the fitting assembled on the end of the hose.

Referring to FIG. 1 of the drawings, the hose fitting is fabricated from a socket member, designated generally by the numeral 10, which has a cylindrical body portion 11 for surrounding the end of a hose and a radially inwardly directed flange 12 at one end, and a tubular nipple member designated generally by the numeral 13. The flange 12 is provided with interior and exterior radial surfaces 14 and 15, respectively, and terminates in a cylindrical surface 16 concentric with the longitudinal axis of the socket member 10.

The socket member 10 is interfitted with the nipple member 13. It will be observed that the member 13 passes through the flange 12 of the socket member until the exterior surface 15 of the flange encounters an abutment 17 on the nipple member 13. The nipple member 13 has an annular groove 18 formed in its surface adjacent the abutment 17 so as to underlie the cylindrical surface 16 of the flange 12 when the abutment 17 is engaged by the socket member 10. It is sufficient to note at this point that the groove 18 in the nipple member 13 has a radially directed sidewall 19 which is spaced axially from the abutment 17 a distance slightly less than the thickness of the flange 12. The margin of the groove adjacent the radially directed wall 19 has a cylindrical surface 20 making approximately a slip fit with the cylindrical surface 16 of the socket member 10. The amount of overlap between the surfaces 16 and 20 as seen in FIG. 1 is somewhat critical. Its significance will be appreciated when the subsequent steps in the manufacture are explained.

The next step in the fabrication of the fitting involves welding the socket member 10 to the nipple member 13 along the line of contact between the flange 12 and the abutment 17. It has been found that this can be accomplished best by means of projection welding. For this purpose the surface area of the abutment 17 must be maintained small in order that the welding heat be concentrated at the interface between the parts.

As is well known, in projection welding it is necessary to develop pressure between the parts to be welded, and to pass large currents therethrough. Because the metal does flow somewhat there will occur slight but controllable axial penetration of the nipple into the socket. The completed assembly should look generally as shown in FIG. 2. It has been found that an allowance of 0.020 inch for axial travel is sufficient. As shown in FIG. 2, a slight fillet is developed at 21 due to the displacement of the metal, and the surface 14 of the flange now overlies the groove 18 rather than the cylindrical surface 20 on the nipple. For a reason which will be understood later on, the spacing between the plane of the surface 14 and the plane of the wall 19 should be on the order of 0.005 inch.

When it is desired to attach the fitting of FIG. 2 to a hose, the hose is inserted in the annular chamber 22 formed in the end of the fitting between the nipple member and the socket member. This chamber is bounded by the radially inner and outer wall surfaces 23 and 24, respectively, and by the bottom wall surface 14. The cylindrical surface 20 may be considered as a part of the surface 23.

After inserting the hose in the chamber, radial crimping or swaging dies are applied to the exterior of the socket member 10 to deform the same into the condition shown in FIG. 3. During the process of deformation of the socket the flange portion 12 tends to cup or bend about the annular web which is of limited cross section. The web 25 is the product produced by welding the flange 12 to the nipple member 13. As a result of the cupping or deformation of the flange 12 the radially inner portion thereof penetrates the groove 18 such that a part of the wall surface 14 moves behind and interlocks with the radial wall surface 19.

So long as the weld remains intact the fitting may be considered as one piece free from any danger of relative rotation between the nipple member and the socket member. If the weld should fail, the two members are still interlocked against axial separation by reason of the interengagement between the flange and the shoulder provided by the wall surface 19.

In the fitting described herein, the surface 20 on the nipple member has a larger diameter than the remainder of the surface 23 which penetrates the hose. This relationship is desirable in order to minimize the wall thickness of the nipple. This is an important consideration where weight is of prime concern.

Any suitable grooving or other irregularity may be provided on the surfaces 23 and 5 in known manner for gripping and establishing the necessary seal with the hose.

Referring to the completed fitting as seen in FIG. 2, it will be observed that the groove 18 in the nipple member cooperates wit the flange 12 of the socket member to provide an annular cavity located at the intersection of the inner wall surface 23 and the bottom wall surface 14. The cavity is bounded by the substantially cylindrical wall surface 16 which extends axially inwardly from the bottom wall surface 14 and the substantially radial wall surface 19 which extends inwardly from the inner wall surface 23 (it being understood that the surface 20 is a part of the surface 23).

For purpose of illustration, the fitting has been shown in the drawings as provided with a female coupling part 26 mounted on the end of the nipple member which extends beyond the socket member. This portion of the fitting is conventional.

As shown in the drawings, the groove 18 in the nipple member consists of a conical wall section and a cylindrical wall section. This is somewhat arbitrary and may be altered so long as the cavity resulting upon welding the socket to the nipple is adequate to receive the flange of the socket member when it is deformed during swaging.

The invention has been described with reference to the presently preferred embodiment thereof. It should be apparent that various changes may be made therein without departing from the true spirit of the invention.

I claim:

1. The method of producing a hose end fitting which comprises the steps of taking a socket member having a tubular body portion for surrounding the end of a hose and a radially inwardly directed flange at one end, the flange having at least an inner sidewall, taking a tubular nipple member having an end portion for entering the end of said hose, and an annular groove beyond said end portion, interfitting said nipple and socket members with said end portion of the nipple passing through said flange into said socket member, and joining the radially inner edge adjacent the exterior of said flange to said nipple member on the side of said groove remote from said end portion by forming an annular web of limited cross section preventing relative rotation between said nipple and socket members and thereby creating a one-piece structure with said groove underlying said flange, said groove being provided with an inner sidewall located on the opposite side of said groove from said web to interlock with said inner sidewall of said flange when the flange is bent about said web and penetrates said groove upon radial contraction of the socket member about an interfitted hose end, said interlock when perfected preventing axial separation of said nipple and socket members in case of fracture of said web.

2. The method according to claim 1, wherein said web is formed by welding.

3. The method according to claim 1, wherein said socket and nipple members are interfitted until an exterior surface of said flange encounters an abutment on said nipple member bordering said groove on the side thereof opposite said sidewall, and forming said web by welding said radially inner edge which is adjacent the exterior of said flange to said abutment.

4. The method according to claim 3, wherein the radially directed sidewall of said groove is located relative to said abutment so as to allow for axial penetration of said nipple member into said socket member during said welding step, and causing controlled penetration of said nipple member into said socket member while welding.

5. The method of producing an end fitting an hose assembly which comprises the steps of taking a socket member having a tubular body portion for surrounding the end of a hose and a radially inwardly directed flange at one end, the flange having at least an inner sidewall, taking a tubular nipple member having an end portion for entering the end of said hose and an annular groove beyond said end portion, interfitting said nipple and socket members with said end portion of the nipple passing through said flange into said socket member, and welding the radially inner edge adjacent the exterior of said flange to said nipple member on the side of said groove remote from said end portion to form an annular web of limited cross section with said flange overlying said groove, positioning the end of said hose between said socket and said nipple members, radially crimping the tubular body portion of said socket member onto said hose and bending said radially inwardly directed flange to penetrate said groove until said inner sidewall of said flange engages an inner sidewall located on the opposite side of said groove with respect to the weld to prevent axial separation of said nipple and socket member in case of fracture of said weld.